UNITED STATES PATENT OFFICE.

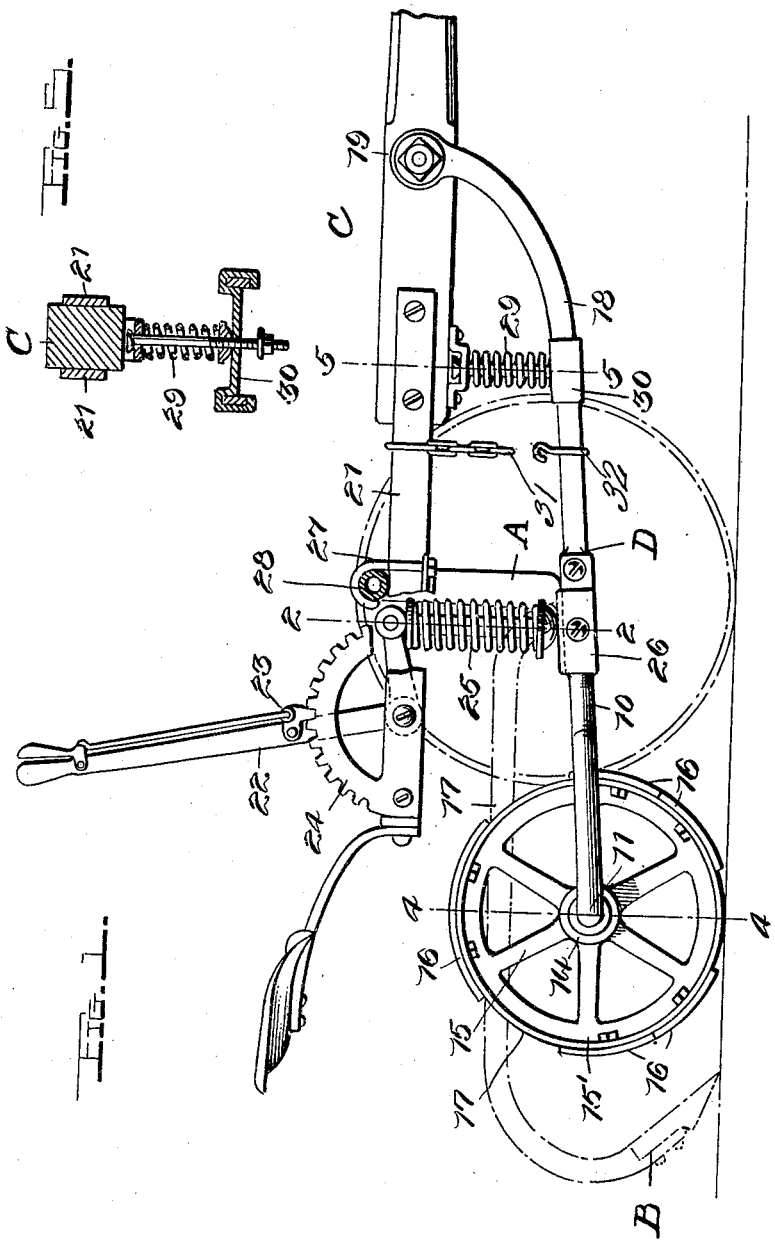

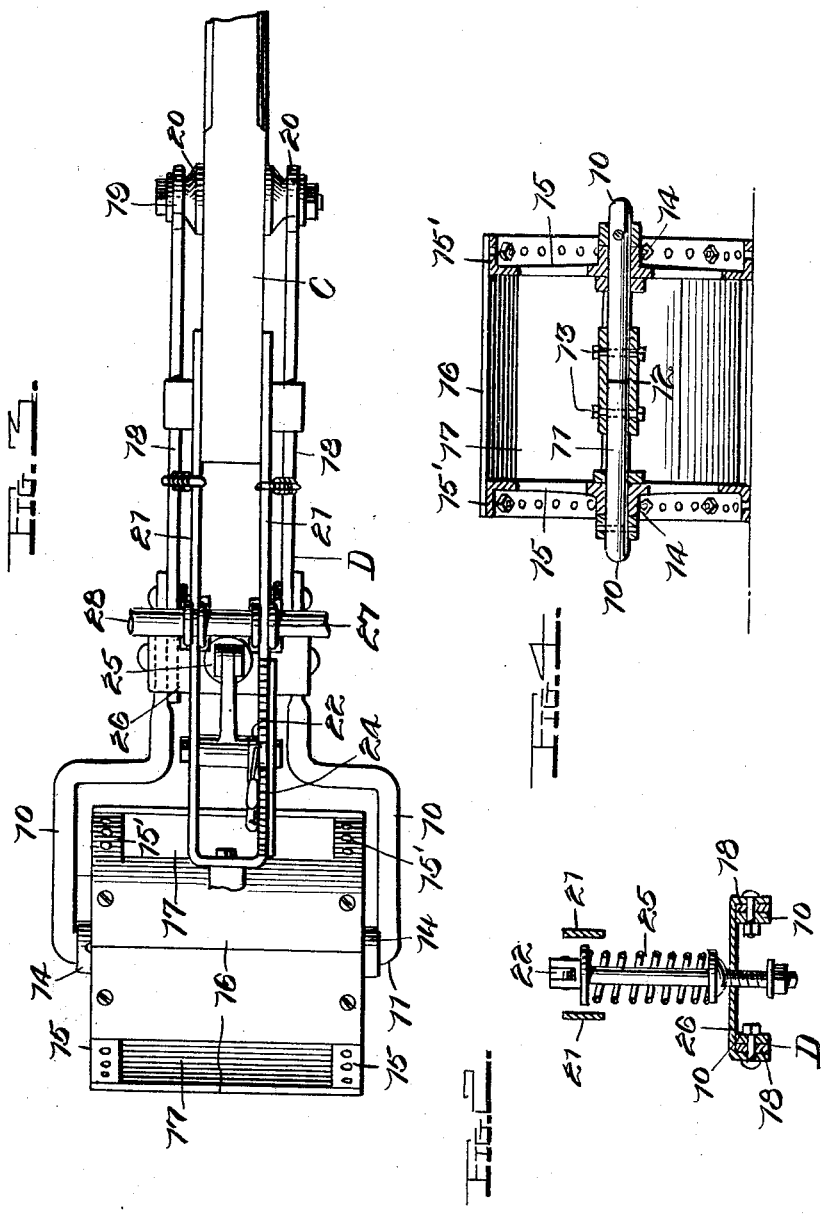

CHARLIE F. JONES AND ERASTUS T. JONES, OF WAYLAND, TEXAS.

COTTON-CHOPPER.

1,111,655.  Specification of Letters Patent.  Patented Sept. 22, 1914.

Application filed August 22, 1911. Serial No. 645,364.

*To all whom it may concern:*

Be it known that we, CHARLIE F. JONES and ERASTUS T. JONES, citizens of the United States, residing at Wayland, in the county of Stephens and State of Texas, have invented certain new and useful Improvements in Cotton-Choppers; and we do hereby declare the following to be a full, clear, and exact description of the invention, such as will enable others skilled in the art to which it appertains to make and use the same.

This invention relates to cotton choppers and is particularly designed as an attachment for cultivators, adapted to be detachably secured to cultivators of all standard characters and types.

The coöperation of an attachment of this nature with a cultivator is such that the cotton operated upon by the chopper is covered by the cultivator thereby performing the double action of cultivating the remaining cotton and removing the undesirable cotton.

With the above and other objects in view, this invention consists in the construction, combination and arrangement of parts, all as hereinafter more fully described, claimed and illustrated in the accompanying drawings, in which, Figure 1 is a side elevation of the cultivator illustrating the coöperation of the present invention therewith; Fig. 2 is a vertical section taken along line 2—2 of Fig. 1 illustrating the construction of the cotton chopping mechanism. Fig. 3 is a top plan view of the cultivator. Fig. 4 is a longitudinal section through the hopper, the axle being shown in elevation. Fig. 5 is a transverse section taken on the line 5—5 of Fig. 1.

Referring to the drawings, A indicates a cultivator of any suitable construction, being provided with the teeth B and the cultivator tongue C. A pair of angularly bent arms or rods 10 having their rear terminals bent inwardly to form the axle portions 11 form a portion of the supporting frame D of the cotton chopper. The axle portions 11 are centrally connected by the sleeve 12 through which the bolts 13 pass forming a rigid construction. Adjacent to the bends which form the axle portions 11 are rotatably mounted the hubs 14 carrying the wheels 15. The rims 15' of the wheels 15 have adjustably secured thereto the curved plates 16, which by the adjustment thereof form the spaces 17 through which the cotton that is to remain standing projects while the plates 16 mash or froce the remaining cotton into the ground after which it is covered by the cultivator teeth B.

The forward terminals of the arms 10 are flattened and are secured to the beams or rods 18 which are curved upwardly at their forward terminals and are adapted to engage the cultivator tongue upon each side thereof. A bolt of any suitable construction passes through the eyes 19 in the forward terminals of the rods 18 and secures said rods to the cultivator tongue C. The shouldered washers 20 are interposed between the rods 18 and the tongue C to permit the free movement of the supporting frame D about the bolt as an axis.

A pair of bars or arms 21 extend rearwardly from the rear terminal of the cultivator tongue C and have pivotally mounted thereon a bell crank lever 22, which coöperates through the instrumentality of the pawl mechanism 23 with the quadrant 24, thereby retaining said bell crank in any desired position. A compression spring connection 25 is interposed between the outer terminal of the work arm of the bell crank 22 and a strap 26 embracing the forward terminals of the angularly bent arms 10. Thus, it will be seen that upon the operation or rotation of the bell crank about its axis, the frame D will be oscillated about the bolt securing the rods 18 to the cultivator tongue raising and lowering the chopping mechanism.

An adjustable clamp 27 embraces the bars 21 and passes under the axle 28 of the cultivator, thereby bracing said bars and forming a rigid foundation for the operation of the bell crank.

A second compression spring 29 is interposed between the strap 30 embracing the rods 18 and provides additional means for exerting a pressure upon the frame D and insuring the contact of the chopping mechanism with the ground.

From the foregoing it will readily be understood that the present invention combines two operations in one thereby promoting economy in the culture of cotton. When it is desired to use the cultivator independently of the cotton chopper, the frame D may be raised if so desired and suspended to chain 31 by means of hook 32 or may be entirely detached from the cultivator at the will of the operator.

Having thus described our invention, what we claim as new and desire to secure by Letters-Patent is:

1. A machine of the class described comprising a wheel supported structure, downwardly and rearwardly extending arms pivotally connected to said structure, a cotton chopper carried by and between the arms, an apertured member supported by the arms adjacent the pivot thereof, a pin loosely connected to the structure and extending loosely through the apertured member, a compression spring upon the pin and bearing downwardly upon said member, a second spring located between the apertured member and the cotton chopper, and adjustable means mounted on the structure for bearing downwardly upon said second spring to press the chopper against the soil.

2. A cotton chopper comprising an elongated frame, a tongue attached to one end thereof, an axle detachably secured to the frame, a pair of arms pivotally secured to the tongue and curved downwardly and rearwardly from the frame, a revolving cotton chopper mounted on said arms, a bar having its ends bent around said arms and provided with an aperture therein, a bracket secured to the underside of the tongue and provided with an aperture therein, a pin adapted to be carried by said bracket and extending through the aperture in the bar, the end of the pin screw threaded and adapted to receive a nut, a coil spring mounted on the pin and adapted to form a tension device for said arms, a second tension device mounted intermediate the first tension device and the cotton chopper, and a pivoted lever attached to the frame and adapted to control the second tension device.

In testimony whereof we affix our signatures in presence of two witnesses.

CHARLIE F. JONES.
ERASTUS T. JONES.

Witnesses:
E. M. NEWMAN,
J. M. GILBERT.

Copies of this patent may be obtained for five cents each, by addressing the "Commissioner of Patents, Washington, D. C."